US009340195B2

(12) United States Patent
Smith

(10) Patent No.: US 9,340,195 B2
(45) Date of Patent: May 17, 2016

(54) SYSTEM, METHOD, AND COMPUTER READABLE MEDIA FOR ADAPTIVELY DETERMINING A BRAKE APPLICATION LEVEL FOR SIGNALING A REMOTE LOCOMOTIVE OF A TRAIN DURING A COMMUNICATION LOSS

(75) Inventor: Eugene A. Smith, Satellite Beach, FL (US)

(73) Assignee: General Electric Company, Schenectady, NY (US)

( * ) Notice: Subject to any disclaimer, the term of this patent is extended or adjusted under 35 U.S.C. 154(b) by 1439 days.

(21) Appl. No.: 11/554,635

(22) Filed: Oct. 31, 2006

(65) Prior Publication Data

US 2007/0241610 A1 Oct. 18, 2007

Related U.S. Application Data

(60) Provisional application No. 60/792,888, filed on Apr. 18, 2006.

(51) Int. Cl.
*B60T 13/66* (2006.01)
*B60T 17/22* (2006.01)

(52) U.S. Cl.
CPC ............... *B60T 17/228* (2013.01); *B60T 13/66* (2013.01)

(58) Field of Classification Search
CPC .............................. B60T 13/665; B60T 17/228
USPC ............... 303/122.15, 3, 7, 9, 15; 246/167 R, 246/182 R, 182 B
See application file for complete search history.

(56) References Cited

U.S. PATENT DOCUMENTS

| 4,553,723 | A | * | 11/1985 | Nichols et al. ............ 246/167 R |
| 5,056,873 | A | * | 10/1991 | Deno et al. ..................... 303/33 |
| 5,460,435 | A | * | 10/1995 | Chew ............................. 303/47 |
| 6,275,165 | B1 | | 8/2001 | Bezos |
| 6,375,276 | B1 | * | 4/2002 | Delaruelle ......................... 303/7 |
| 6,401,015 | B1 | | 6/2002 | Stewart et al. |
| 6,443,538 | B1 | * | 9/2002 | Smith et al. .................. 303/128 |
| 2003/0107262 | A1 | | 6/2003 | Smith et al. |

FOREIGN PATENT DOCUMENTS

WO WO 02/53439 7/2002

* cited by examiner

*Primary Examiner* — Anna Momper
*Assistant Examiner* — Stephen Bowes
(74) *Attorney, Agent, or Firm* — GE Global Patent Operation

(57) ABSTRACT

In a railroad train having a brake system including a fluid carrying brake pipe (14) having an exhaust (52) and connecting a lead locomotive (12) and at least one remote locomotive, the train further comprising a communication system (24) for communicating between the lead locomotive and the remote locomotive, a method for adaptively determining a brake application for signaling a remote locomotive of a train during a communication loss includes determining a brake system operating condition of the train (72). The method also includes determining an operability condition of the communication system (74) and identifying an operator commanded brake application level at the lead locomotive during a communication system inoperability condition (76). The method further includes determining a signaling brake application level sufficient for signaling the remote locomotive via the brake pipe responsive to the monitored brake system operating condition (78).

18 Claims, 2 Drawing Sheets

SYSTEM, METHOD, AND COMPUTER READABLE MEDIA FOR ADAPTIVELY DETERMINING A BRAKE APPLICATION LEVEL FOR SIGNALING A REMOTE LOCOMOTIVE OF A TRAIN DURING A COMMUNICATION LOSS

This application claims priority based on U.S. Provisional Application No. 60/792,888 filed Apr. 18, 2006, which is incorporated herein by reference.

FIELD OF THE INVENTION

Embodiments of the present invention relate generally to the field of locomotive control, and more particularly to a method of adaptively determining a brake application level for signaling a remote locomotive of a train during a communication loss.

BACKGROUND OF THE INVENTION

Distributed power train operation supplies motive power from a lead locomotive and one or more remote locomotives spaced apart from the lead locomotive in a train consist. Each lead and remote locomotive includes an air brake control system for controlling braking operations and a communication system for exchanging information between lead and remote locomotives over a communication link. A brake pipe fluidically interconnects each of the locomotives and rail cars of the train wherein modulation of a fluid flow, such as a fluid pressure in the brake pipe, is conventionally used to indicate desired braking operations. Brake application is typically accomplished by venting, or reducing a pressure in the brake pipe. However, brake pipe venting at only the lead locomotive of a train requires propagation of the corresponding brake pipe pressure reduction along the length of the train, thus slowing brake application at rail cars and remote locomotives near the end of the train. In distributed power trains, braking is more effectively accomplished by venting a brake pipe at both the lead and remote locomotives of the train, thus accelerating the brake pipe venting and the application of brakes throughout the train.

For distributed power trains with an operative communication link between a lead and remote locomotives, wireless traction and braking commands are typically transmitted to each remote unit over the link, such as when a train operator at the lead commands a brake application. For example, in response to a wireless brake application command, each remote locomotive also vents the brake pipe. Similarly, a brake release initiated at the lead is also communicated over the radio link, and each remote may respond by releasing its brakes and charging the brake pipe.

In the event that radio communication becomes inoperable in a distributed power train, it may be desired to command a remote locomotive experiencing a radio communication loss to enter a fail safe mode of operation, such as disabling charging or venting of the brake pipe at the remote, and/or reducing a traction condition of the remote. Such a fail safe state may be initiated by applying the brakes at the lead locomotive to generate a brake pipe brake application signal propagated along the brake pipe to the remote locomotive. For example, when a communication loss condition is indicated at a lead locomotive, such as via a communication loss indicator at a control panel of the lead locomotive, the operator of the lead locomotive may command a fail safe state by applying a minimum brake application to the train via the brake pipe. The minimum brake application signal propagated along the brake pipe from the lead locomotive is then interpreted as a command to suspend brake pipe charging and/or enter an idle traction state at the remote locomotive.

BRIEF DESCRIPTION OF THE INVENTION

In one embodiment, the invention includes a method for adaptively determining a brake application level for signaling a remote locomotive of a railroad train during a communication loss, the railroad train having a brake system including a fluid carrying brake pipe having an exhaust and connecting a lead locomotive and at least one remote locomotive, the railroad train further comprising a communication system for communicating between the lead locomotive and the remote locomotive. The method includes determining a brake system operating condition of the train and determining an operability condition of the communication system. The method also includes identifying an operator commanded brake application level at the lead locomotive during a communication system inoperability condition. The method further includes determining a signaling brake application level sufficient for signaling the remote locomotive via the brake pipe responsive to at least one of the brake system operating condition, the operability condition of the communication system, and the operator commanded brake application level.

In another embodiment, the invention includes a system for adaptively determining a brake application level for signaling a remote locomotive of a railroad train during a communication loss, the railroad train having a brake system including a fluid carrying brake pipe having an exhaust and connecting a lead locomotive and at least one remote locomotive, the railroad train further comprising a communication system for communicating between the lead locomotive and the remote locomotive. The system includes a first sensor for determining a brake system operating condition of the train and a second sensor for determining an operability condition of the communication system. The system also includes a third sensor for identifying an operator commanded brake application level at the lead locomotive during a communication system inoperability condition. The system further includes a controller in communication with the first, second, and third sensors and configured for determining a signaling brake application level sufficient for signaling the remote locomotive via the brake pipe responsive to at least one of the brake system operating condition, the operability condition of the communication system, and the operator commanded brake application level In another embodiment, the invention includes computer readable media containing program instructions for adaptively determining a brake application level for signaling a remote locomotive of a railroad train during a communication loss, the railroad train having a brake system including a fluid carrying brake pipe having an exhaust and connecting a lead locomotive and at least one remote locomotive, the railroad train further comprising a communication system for communicating between the lead locomotive and the remote locomotive. The computer readable media includes a computer program code for determining a brake system operating condition of the train and a computer program code for determining an operability condition of the communication system. The computer readable media also includes a computer program code for identifying an operator commanded brake application level at the lead locomotive during a communication system inoperability condition. The computer readable media further includes a computer program code for determining a signaling brake application level sufficient for signaling the remote locomotive via the brake pipe responsive to at least one of the brake system operating condition, the operability condition of the communication system, and the operator commanded brake application level.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The present inventor has observed in a distributed power train operating with a communication loss condition that if a brake pipe has not charged sufficiently from a previous braking state, a brake application made by the operator of the lead locomotive to command a remote locomotive to enter an idle down state and/or suspend brake pipe charging may not be propagated over a brake pipe to the remote locomotive. Consequently, during the communication loss period, the remote locomotive may remain in traction and/or a brake charging state that may result in undesirably long stopping distances, excessively high in train forces, etc. To compensate for the above problem, a train operator needs to assess a train length and configuration, determine if the train brakes are applied or released, and evaluate a state of charging condition of the brake pipe to determine an amount of brake pipe pressure reduction that is needed to achieve a desired traction and/or charging condition at the remote locomotives of the train during a communication loss condition. The inventor has developed an innovative scheme that relieves the operator from having to evaluate train configuration and train operating parameters to determine a brake application level sufficient for signaling the remote locomotive to achieve a desired operating condition of the remote locomotive.

Figure 1:
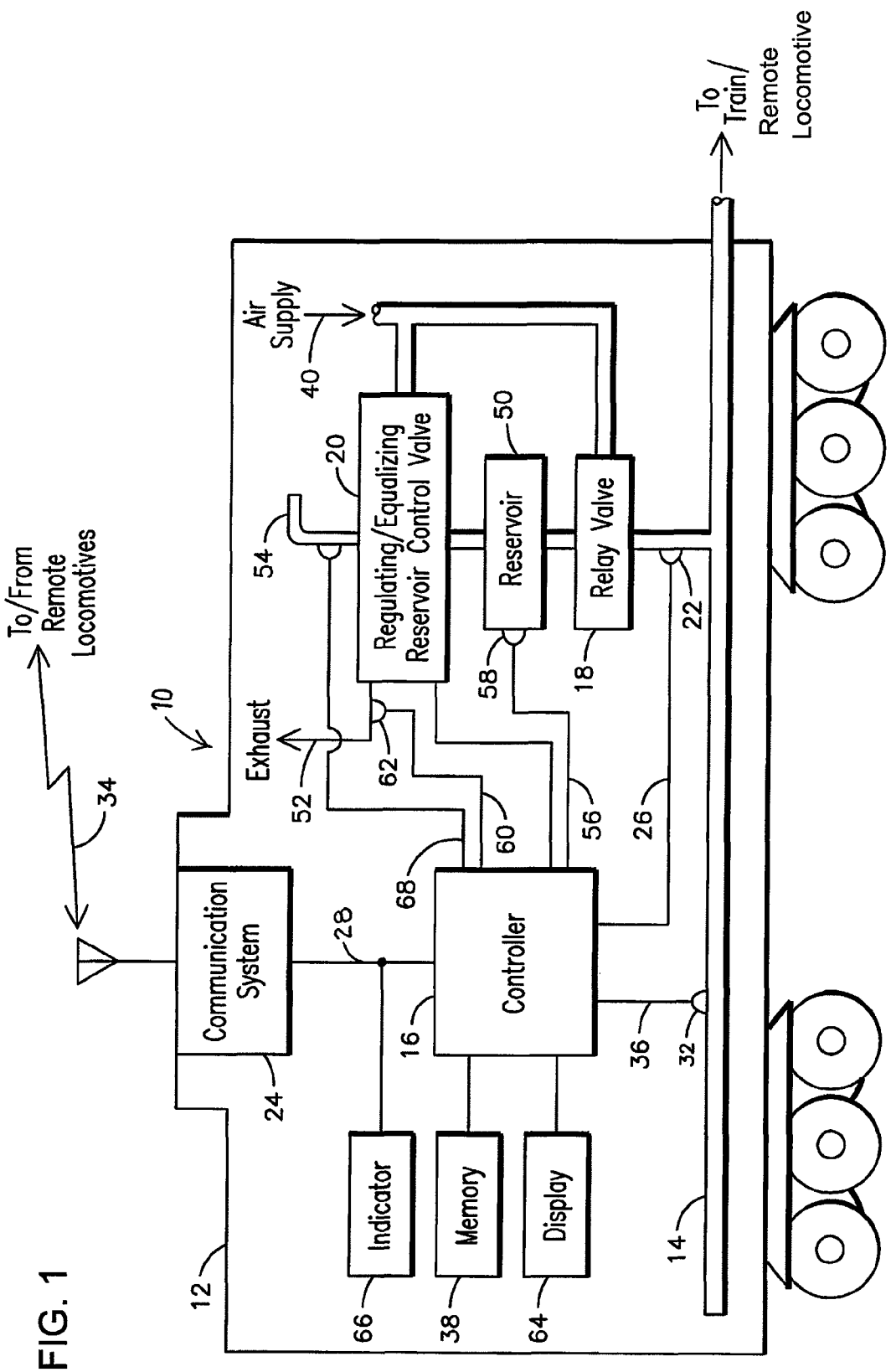
FIG. 1 is a schematic diagram of an exemplary system for adaptively determining a brake application for signaling a remote locomotive of a distributed power train during a communication loss.

FIG. 1 is a schematic diagram of an exemplary system 10 for adaptively controlling a brake application for signaling a remote locomotive from a lead locomotive 12 of a train, such as a distributed power train, during a communication loss. The system 10 may include a regulating/equalizing reservoir control valve 20 receiving an air supply 40. The regulating/equalizing reservoir control valve 20 may be operable to selectively vent air, via exhaust port 52, and supply air via a fluid connection to a reservoir 50 to control application and release of the train brakes. The reservoir 50 may also provide air to a relay valve 18 that also receives air via air supply 40. The regulating/equalizing reservoir control valve 20 may be controlled by a manually operated brake handle 54 and/or may be automatically controlled to selectively vent air or supply air to the equalizing reservoir 50 which in turn controls the brake pipe 14 via the relay valve 18 to achieve a desired level of brake application or brake release.

The system 10 may also include a communication system 24, such as a wireless communication system, for communication with one or more remote locomotives (not shown) of the train via communication link 34. The communication system 24 may generate a communication operability status signal 28 from the communication system 24 indicating whether or not the wireless link 34 is operable for communicating with one or more remote locomotives of the train. An indicator 66 may receive the communication operability status signal 28 and generate an indication, such as a visual and/or aural indication, to an operator responsive to the communication operability status signal 28.

In an aspect of the invention, the system 10 includes a controller 16 receiving a fluid flow signal 26 from a fluid flow sensor 22. The fluid flow sensor 22 monitors a condition of the brake pipe fluid flow, such as fluid flow into the brake pipe 14 at the lead locomotive 12, and generates a fluid flow signal 26 responsive to a sensed fluid flow condition. The controller 16 may also receive a fluid pressure signal 36 from a fluid pressure sensor 32. The fluid pressure sensor 32 may monitor a condition of brake pipe fluid pressure, such as fluid pressure in the brake pipe 14 at the lead locomotive 12, and generate the fluid pressure signal 36 responsive to a sensed fluid pressure condition. The brake pipe fluid pressure may be indicative of a brake application level commanded at the lead locomotive 12. The controller 16 may also receive a reservoir pressure signal 56 responsive to a fluid pressure in the reservoir 50 from a reservoir pressure sensor 58. The controller 16 may also receive an exhaust flow signal 60 responsive to an exhaust flow from the regulating/equalizing reservoir control valve 20 from an exhaust flow sensor 62. The controller 16 may also receive the communication operability status signal 28 from the communication system 24 indicating whether or not the wireless link 34 is operable for communicating with one or more remote locomotives 12 of the train. The controller 16 may also receive a brake application state signal, for example, responsive to a position of the brake valve handle 54, indicative of an operator commanded brake application or release. Controller 16 may take any form known in the art, for example, an analog or digital microprocessor or computer, and it may be integrated into or combined with one or more controllers used for other functions related to the operation of the lead locomotive 12.

In an embodiment of the invention, the controller 16 may be configured for providing an adaptive brake application control scheme for signaling a remote locomotive of a distributed power train during a communication loss via the brake pipe. The scheme may include automatically controlling a brake application and/or providing indicia to an operator of the train to be used to control a brake application. For example, the controller 16 may be configured to implement steps for determining a brake application sufficient for signaling a remote locomotive to reduce a tractive effort and/or limit charging of the brake pipe at the remote locomotive during a communication loss state. Based on the determined sufficient brake application, when an operator commands an insufficient braking application during the communication loss, the controller 16 may notify the operator, for example, via display 64 that an additional braking application needs to be applied to ensure a brake signal is propagated to the remote. In another embodiment, the controller 16 may automatically control a brake application based on the determined sufficient brake application to ensure that a sufficient brake application is commanded. The steps necessary for such processes may be embodied in hardware, software and/or firmware in any form that is accessible and executable by processor 16 and may be stored on any medium that is convenient for the particular application, such as memory 38.

Figure 2:
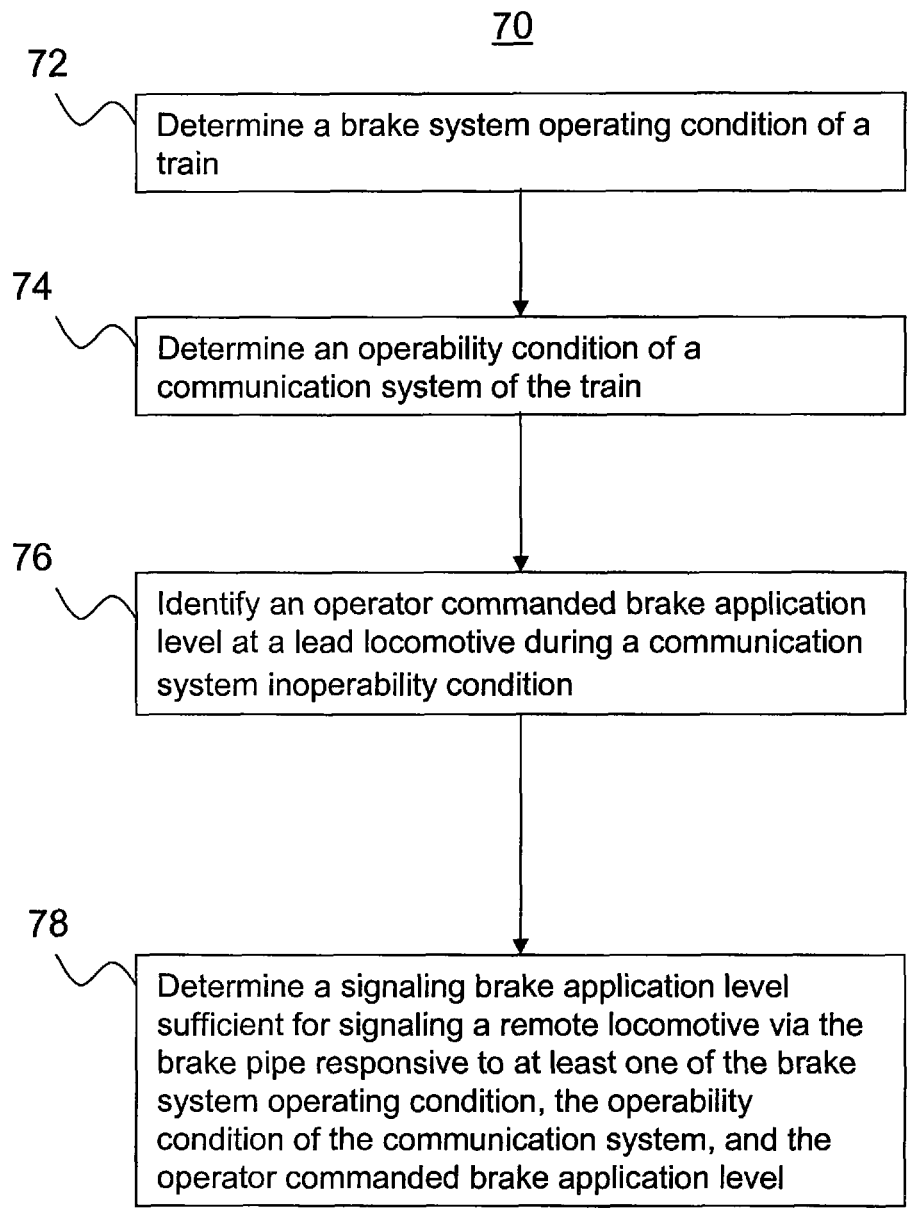
FIG. 2 is a flow chart of an exemplary method for adaptively determining a brake application for signaling a remote locomotive of a distributed power train during a communication loss.

As shown in the flow chart 70 of FIG. 2, the steps may include determining a brake system operating condition of the train 72 and determining an operability condition of the communication system 74. The steps may also include identifying an operator commanded brake application level at the lead locomotive during a communication system inoperability condition 76. The steps may then include determining a signaling brake application level sufficient for signaling the remote locomotive via the brake pipe responsive to at least one of the brake system operating condition, the operability condition of the communication system, and the operator commanded brake application level.

To perform these steps, the controller 16 of FIG. 1 may be configured for monitoring a braking state of the train, such as a brake application state or a brake release state, and/or duration of the braking state. The controller 16 may further monitor respective operating conditions of elements of the train brake system, such as by monitoring signals 26, 36, 60, and 56. During a communication loss state indicated, for example, by the communication operability status signal 28, the controller 16 may use the monitored braking state and monitored signals to determine an appropriate brake application for reliably commanding an operating condition of the remote locomotive via the brake pipe 14.

In an example embodiment, when a communication loss occurs during a brake release state, the controller 16 may be configured to provide a brake application level based on a value of the brake flow signal 26. The controller 16 may be configured for generating a smaller application for a relatively smaller sensed flow, and generating a larger application for a relatively larger sensed flow. Generating may include providing an indication of an appropriate brake application level and/or may also include automatically applying the appropriate brake application level. For example, when a sensed flow of less than about 20 cubic feet per minute (cfm), a minimum service application of about 7 pounds per square inch (psi) may be generated as sufficient for ensuring the resulting brake pipe signal is propagated to the remote locomotive. Accordingly, if the operator has made a minimum service application, additional brake application may not be needed. For a sensed flow of between about 20 cfm and about 60 cfm, a full service application of about 15 psi may be generated. Accordingly, if the operator has only made a minimum service application, an additional brake application of about 8 psi may be needed. For a sensed flow greater than about 60 cfm, an emergency application may be generated.

When a communication loss occurs during a brake application state, the controller 16 may be configured to generate a brake application level based on a level of brake application commanded by the operator, a time elapsed since brake application, and/or a brake pipe exhaust flow. For example, for a brake application of less than about 16 psi, and when more than about 90 seconds has elapsed from the initiation of the brake application when the communication loss occurs, and when brake pipe exhausting has stopped, for example, when the exhaust flow is about 0 cfm, a supplemental brake application of about 10 psi may be generated by the controller 16. When less than about 90 seconds has elapsed since initiation of a brake application when the communication loss occurs, or when the brake pipe is exhausting, or when a brake application of greater than 16 psi has been applied, an emergency brake application may be generated by the controller 16.

In another exemplary embodiment of the invention, the system 10 may include memory 38 storing a braking schedule comprising a plurality of brake application levels corresponding to a brake application and operating parameters of the train braking system. The controller 16 may include logic executable for accessing the braking schedule stored in the memory 38 for adaptively determining a brake application level for signaling a remote locomotive of a distributed power train during a communication loss. In an aspect of the invention, the braking schedule may embody the brake application levels responsive to operating parameters of the train braking system as described previously.

Based on the foregoing specification, the invention may be implemented using computer programming or engineering techniques including computer software, firmware, hardware or any combination or subset thereof, wherein the technical effect is to adaptively determine a brake application level for signaling a remote locomotive of a distributed power train during a communication loss. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A method comprising:
   determining an operating condition of a brake system of a distributed power train;
   identifying an operator commanded brake application level at a lead locomotive of the train in response to a loss in communication between the lead locomotive and a remote locomotive of the train, wherein the loss in communication prevents braking commands from being communicated from the lead locomotive to the remote locomotive using a communication system of the train; and
   automatically determining, at the lead locomotive, a signaling brake application level that is sufficient for signaling the remote locomotive via a brake pipe of the train to apply brakes of the remote locomotive when the operator commanded brake application level is insufficient for propagation of a signal over the brake pipe from the lead locomotive to the remote locomotive.

2. The method of claim 1, further comprising automatically applying an additional amount of brake application when the signaling brake application level is more than the operator commanded brake application level.

3. The method of claim 1, further comprising notifying an operator of the lead locomotive that an additional amount of brake application is needed when the signaling brake application level is more than the operator commanded brake application level.

4. The method of claim 1, wherein determining the operating condition of the brake system comprises sensing at least one of a brake pipe fluid flow, a brake pipe fluid pressure, a fluid reservoir pressure, or a brake system exhaust flow.

5. The method of claim 1, further comprising generating an emergency brake application level when the operator commanded brake application level is greater than about 16 pounds per square inch.

6. The method of claim 1, further comprising generating an emergency brake application when less than about 90 seconds has elapsed since initiation of the operator commanded brake application level.

7. The method of claim 1, further comprising, when the operator commanded brake application level indicates a brake application state, generating the signaling brake application level responsive to at least one of a level of brake application commanded by the operator, a time elapsed since a previous brake application, or a brake pipe exhaust flow.

8. The method of claim 7, further comprising determining a time elapsed since initiation of the operator commanded brake application level when the loss in communication is identified.

9. The method of claim 1, further comprising sensing a brake pipe exhaust flow.

10. The method of claim 9, further comprising generating an additional brake application level of about 10 pounds per square inch when the operator commanded brake application level is less than about 16 pounds per square inch, a determined time elapsed since initiation of the operator commanded brake application level is more than about 90 seconds, and the brake pipe exhaust flow that is sensed is about 0 cubic feet per minute.

11. The method of claim 9, further comprising generating an emergency brake application level when the brake pipe exhaust flow is greater than about 60 cubic feet per minute.

12. The method of claim 1, further comprising, when the operator commanded brake application level indicates a brake release state, generating the signaling brake application level responsive to a sensed brake pipe fluid flow.

13. The method of claim 12, further comprising generating the signaling brake application level at about 7 pounds per square inch when the sensed brake pipe fluid flow of the brake system is less than about 20 cubic feet per minute.

14. The method of claim 12, further comprising generating the signaling brake application level at about 15 pounds per square inch when the sensed brake pipe fluid flow is between about 20 cubic feet per minute and about 60 cubic feet per minute.

15. The method of claim 12, further comprising generating an emergency brake application level when the sensed brake pipe fluid flow is more than about 60 cubic feet per minute.

16. A system comprising:
a first sensor for determining an operating condition of a brake system of a distributed power train;
a second sensor for identifying a loss in communication between a lead locomotive and a remote locomotive of the train that prevents braking commands from being communicated from the lead locomotive to the remote locomotive using a communication system of the train;
a third sensor for identifying an operator commanded brake application level at the lead locomotive during the loss in communication; and
a controller in communication with the first, second, and third sensors and configured for automatically determining, at the lead locomotive, a signaling brake application level that is sufficient for signaling the remote locomotive via a brake pipe of the train when the operator commanded brake application level is insufficient for propagation of a signal over the brake pipe from the lead locomotive to the remote locomotive.

17. The system of claim 16, further comprising a memory in communication with the controller for storing a braking schedule comprising predetermined signaling brake application levels corresponding to at least one of the operating condition of the brake system, the operator commanded brake application level, or a time elapsed since a brake application when the loss in communication is identified.

18. A method comprising:
determining an operating condition of a brake system of a train, the train comprising a lead locomotive, a remote locomotive spaced apart from the lead locomotive, and a communication system for communicating between the lead locomotive and the remote locomotive for distributed power operations, the brake system including a fluid carrying brake pipe connecting the lead locomotive and the remote locomotive;
determining an operability condition of the communication system;
identifying an operator commanded brake application level at the lead locomotive during a communication system inoperability condition; and
automatically determining a signaling brake application level sufficient for signaling the remote locomotive from the lead locomotive over the brake pipe when the operator commanded brake application level is insufficient for propagation over the brake pipe from the lead locomotive to the remote locomotive, the signaling brake application level determined responsive to the operating condition of the brake system.

* * * * *